(12) United States Patent
Murata

(10) Patent No.: US 9,278,583 B2
(45) Date of Patent: Mar. 8, 2016

(54) PNEUMATIC TIRE

(75) Inventor: Takehiko Murata, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 404 days.

(21) Appl. No.: 13/805,229

(22) PCT Filed: Jul. 1, 2011

(86) PCT No.: PCT/JP2011/065185
§ 371 (c)(1),
(2), (4) Date: Dec. 18, 2012

(87) PCT Pub. No.: WO2012/005187
PCT Pub. Date: Jan. 12, 2012

(65) Prior Publication Data
US 2013/0092304 A1  Apr. 18, 2013

(30) Foreign Application Priority Data
Jul. 7, 2010 (JP) .................................. 2010-155061

(51) Int. Cl.
*B60C 11/03* (2006.01)
*B60C 11/04* (2006.01)
*B60C 11/12* (2006.01)

(52) U.S. Cl.
CPC ............... *B60C 11/04* (2013.01); *B60C 11/033* (2013.04); *B60C 11/0306* (2013.04);
(Continued)

(58) Field of Classification Search
CPC .............. B60C 11/033; B60C 2011/0381; B60C 11/04; B60C 11/12; B60C 2011/1277; B60C 2011/1286; B60C 2011/129; B60C 2011/1295; B60C 2011/0386; B60C 11/3606; B60C 11/1272; B60C 2011/1209
USPC ..................................... 152/900–901, 209.18
See application file for complete search history.

(56) References Cited

U.S. PATENT DOCUMENTS 3,841,374 A * 10/1974 Boileau .................... 152/209.27
3,897,813 A *  8/1975 Verdier .................... 152/209.18
(Continued)

FOREIGN PATENT DOCUMENTS

DE     8708747 U1    8/1987
JP     02114004 A  *  4/1990  ............. B60C 11/06
(Continued)

OTHER PUBLICATIONS

Machine Translation: JP2009012534 A; Saito et al.; (no date).*
(Continued)

*Primary Examiner* — Steven D Maki
*Assistant Examiner* — Kendra Ly
(74) *Attorney, Agent, or Firm* — Birch, Stewart Kolasch & Birch, LLP.

(57) ABSTRACT

A pneumatic tire is provided on the tread portion (2) with
a pair of crown circumferential grooves (3) that extending on either side of the tire equator (C);
a pair of shoulder circumferential grooves (4) each extending between the crown circumferential groove (3) and a ground-contacting end (2t);
a crown rib (5) extending between the crown circumferential grooves (3);
middle ribs (6) each extending between the crown circumferential grooves (3) and the shoulder circumferential grooves (4); and
shoulder ribs (7) each extending between the shoulder circumferential groove (4) and the ground-contacting end (2t).
The groove volume ratio Rc of the crown rib, which is a ratio of the total volume of the grooves and sipes provided on the crown rib to the rib volume of the crown rib (5),
the groove volume ratio Rm of the middle rib (6), and
the groove volume ratio Rs of the shoulder rib (7)
satisfy the relationship,
$Rc <= Rm < Rs$.

12 Claims, 6 Drawing Sheets

(52) U.S. Cl.
CPC ............ *B60C 11/12* (2013.01); *B60C 11/1204* (2013.04); *B60C 11/1236* (2013.04); *B60C 11/1272* (2013.04); *B60C 2011/039* (2013.04); *B60C 2011/0353* (2013.04); *B60C 2011/0381* (2013.04); *B60C 2011/0386* (2013.04); *B60C 2011/0388* (2013.04); *B60C 2011/1277* (2013.04); *B60C 2011/1286* (2013.04)

(56) References Cited

U.S. PATENT DOCUMENTS

| | | | | |
|---|---|---|---|---|
| 4,862,934 | A | * | 9/1989 | Yamazaki ................. 152/209.16 |
| 4,926,919 | A | * | 5/1990 | Hopkins et al. ........... 152/209.22 |
| 5,188,684 | A | * | 2/1993 | Himuro .................... 152/209.15 |
| 2003/0005992 | A1 | * | 1/2003 | Radulescu ................. 152/209.3 |
| 2009/0229721 | A1 | | 9/2009 | Ikeda |

FOREIGN PATENT DOCUMENTS

| | | | | | |
|---|---|---|---|---|---|
| JP | 06080002 | A | * | 3/1994 | .............. B60C 11/12 |
| JP | 11105513 | A | * | 4/1999 | .............. B60C 11/12 |
| JP | 2007-308079 | A | | 11/2007 | |
| JP | 2008-222075 | A | | 9/2008 | |
| JP | 2009-12533 | A | | 1/2009 | |
| JP | 2009012534 | A | * | 1/2009 | .............. B60C 11/04 |
| JP | 2009-35130 | A | | 2/2009 | |
| JP | 2009-214775 | A | | 9/2009 | |
| JP | 2010030520 | A | * | 2/2010 | .............. B60C 11/12 |

OTHER PUBLICATIONS

Machine Translation: JP02114004 A; Takahashi, Osamu; (no date).*
Machine Translation: JP 06080002 A; Yamashita, Nobuhiro; (no date).*
Machine Translation: JP 2010030520 A; Hashimoto, Yukihiro; no date.*
Machine Translation: JP 11105513 A; Nakano, Tatsuro; no date.*
International Search Report issued in PCT/JP2011/065185, dated Sep. 20, 2011.
Extended European Search Report for European Application No. 11803521.1, dated Oct. 29, 2013.

* cited by examiner

PNEUMATIC TIRE

TECHNICAL FIELD

The present invention relates to a pneumatic tire capable of improving steering stability by increasing cornering power in all load range, particularly in a low load.

BACKGROUND OF THE INVENTION

In a conventional pneumatic tire, when vertical load increases, a ground contacting area of the tread portion increases, and the cornering power of the tire increases. In other words, when the load on the tire decreases, the cornering power of the tire also decreases. Therefore, for example, on a front-engine and front-drive car having a large front load, the cornering power of a tire on a rear wheel is liable to decrease relatively more than the cornering power of a tire on a front wheel. Such an unbalance of the cornering powers causes a decrease of rear following capability while changing lanes and while cornering. Therefore, the improvement of the steering stability has been awaited.

Moreover, to improve the cornering power in all load range, for example, to enhance rubber hardness of the tread rubber is one idea, but there are possibilities to deteriorate driving noise and ride comfort. And, to decrease rigidity of a belt layer for tightening a carcass of the tire is another idea. However, there are possibilities of decrease in grip performance, driving noise performance, and antiwear performance.

The following Patent Document 1 discloses a pneumatic tire being capable of improving handle responsibility. However, in such a pneumatic tire, the circumferential rigidity of a central area of the tread portion having a ground pressure relatively large is set smaller than a shoulder region. There is therefore a problem that a deformation of the central area caused by a load change increases, and the cornering power cannot be improved in a low load range. Patent Document 1: Japanese Unexamined Patent Application Publication No. 2009-35130.

DISCLOSURE OF THE INVENTION

Problems to be Solved by the Invention

It is therefore, in view of the above-mentioned problems, an object of the present invention to provide pneumatic tire being capable of improving steering stability by increasing cornering power in all load range, particularly in the low load. This invention is based on forming a tread portion with a rib pattern having a comparatively small form change of a ground contacting shape, and on limiting each groove volume ratio of a crown rib, a middle rib, and a shoulder rib to within a certain definite range.

Means for Solving the Problem

In the invention of claim 1 is characterized in that a pneumatic tire provided on the tread portion with a pair of crown circumferential grooves each extending continuously in the tire circumferential direction on either side of the tire equator;

a pair of shoulder circumferential grooves each extending continuously in the tire circumferential direction between the crown circumferential groove and a tread ground-contacting end;

a crown rib extending continuously in the tire circumferential direction between the crown circumferential grooves;

middle ribs each extending continuously in the tire circumferential direction between the crown circumferential groove and the shoulder circumferential groove; and shoulder ribs each extending continuously in the tire circumferential direction between the shoulder circumferential groove and the tread ground-contacting end.

And, a groove volume ratio Rc of the crown rib, which is a ratio of the total volume of the grooves and sipes provided on the crown rib to the rib volume of the crown rib, a groove volume ratio Rm of the middle rib, and a groove volume ratio Rs of the shoulder rib satisfy the relationship, $$Rc<=Rm<Rs.$$

The invention of claim 2 relates to the pneumatic tire as set forth in claim 1. The minimum groove width of the crown circumferential groove is from 8 to 18 mm and is from 1.25 to 2.0 times the minimum groove width of the shoulder circumferential groove.

The invention of claim 3 relates to the pneumatic tire as set forth in claim 1 or 2. In the crown rib, crown sipes extending inward in the tire axial direction from a pair of the crown circumferential grooves and terminating without reaching the tire equator are spaced at an interval alternately in the tire circumferential direction.

The invention of claim 4 relates to the pneumatic tire as set forth in any one of claims of 1 to 3. The middle rib comprises an inner middle sipe extending outward in the tire axial direction from the crown circumferential groove and terminating without reaching the shoulder circumferential groove and an outer middle sipe extending inward in the tire axial direction from the shoulder circumferential groove and terminating without reaching the crown circumferential groove.

The invention of claim 5 relates to the pneumatic tire as set forth in claim 4. The axial length of the inner middle sipe is in a range of from 100 to 130% of the axial length of the crown sipe.

The invention of claim 6 relates to the pneumatic tire as set forth in any one of claims 1 to 5. The shoulder rib comprises a shoulder lug groove extending inward in the tire axial direction from the tread ground-contacting end and terminating without reaching the shoulder circumferential groove, and a shoulder sipe extending outward from the shoulder circumferential groove in the tire axial direction.

The invention of claim 7 relates to the pneumatic tire as set forth in claim 6. An axial length of the shoulder sipe is larger than an axial length of the outer middle sipe.

The invention of claim 8 relates to the pneumatic tire as set forth in any one of claims 1 to 7. The shoulder rib comprises an inward region disposed axially inward with respect to a shoulder rib center line passing through its center of the maximum axial width and extending in the tire circumferential direction, and an outward region disposed axially outward with respect to the shoulder volume centerline.

The groove volume ratio Rso of the outward region is from 1.1 times to 1.5 times the groove rib ratio Rsi of the inward region.

The invention of claim 9 relates to the pneumatic tire as set forth in any one of claims 1 to 8. At a standard state where the tire is mounted on a standard rim, inflated at a standard internal pressure, and no-loaded, a ratio (D/TW) between a camber amount D and a tread ground-contacting width TW is from 0.04 to 0.05; the tread ground-contacting width TW is an axial distance between the tread ground-contacting ends, and the camber amount D is a radial distance from the tread ground-contacting end to the tire equator.

The invention of claim 10 relates to the pneumatic tire as set forth in any one of claims 1 to 9. The groove volume ratio Rc of the crown rib and the groove volume ratio Rm of the middle rib are from 5 to 30%, and the groove volume ratio Rs of the shoulder rib is from 7 to 35%.

The "standard rim" means a rim determined for each tire by a standard including one on which the tire is based, and the regular rim is a standard rim in the case of JATMA, a "Design Rim" in the case of TRA, and a "Measuring Rim" in the case of ETRTO.

The "standard internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO. When the tire is for a passenger vehicle, the standard internal pressure is 180 KPa.

In this description, unless otherwise noted, each dimension of portions of the tire is measured under the above-mentioned standard state.

Effect of the Invention

A pneumatic tire of the present invention is provided on tread portion with
a pair of crown circumferential grooves extending continuously on either side of the tire equator;
a pair of shoulder circumferential grooves each extending continuously between the crown circumferential groove and a ground-contacting end;
a crown rib extending continuously in the tire circumferential direction between the crown circumferential grooves;
middle ribs each extending continuously in the tire circumferential direction between the crown circumferential groove and the shoulder circumferential groove; and
shoulder ribs each extending continuously in the tire circumferential direction between the shoulder circumferential groove and the ground-contacting end.
The pneumatic tire comprising this rib pattern has a higher rigidity on the tread portion than a pneumatic tire comprising a tread portion formed of a block row. It can improve the cornering power in all load range and improve the steering stability. If the pneumatic tire comprising the rib pattern is forced by a larger load, it can suppress an excessive improvement of the cornering power and can improve stability at high speeds.

In the pneumatic tire of the present invention, the groove volume ratio Rc of the crown rib, the groove volume ratio Rm of the middle ribs, and the groove rib ratio Rs of the shoulder ribs satisfy the relationship, $$Rc<=Rm<Rs.$$

The circumferential rigidity of the crown rib is, therefore, relatively increased; therefore, the cornering power can be effectively improved in a low load state of having a high ratio of ground contacting area to a ground-contacting surface.

EXPLANATION OF THE REFERENCE

Figure 1:
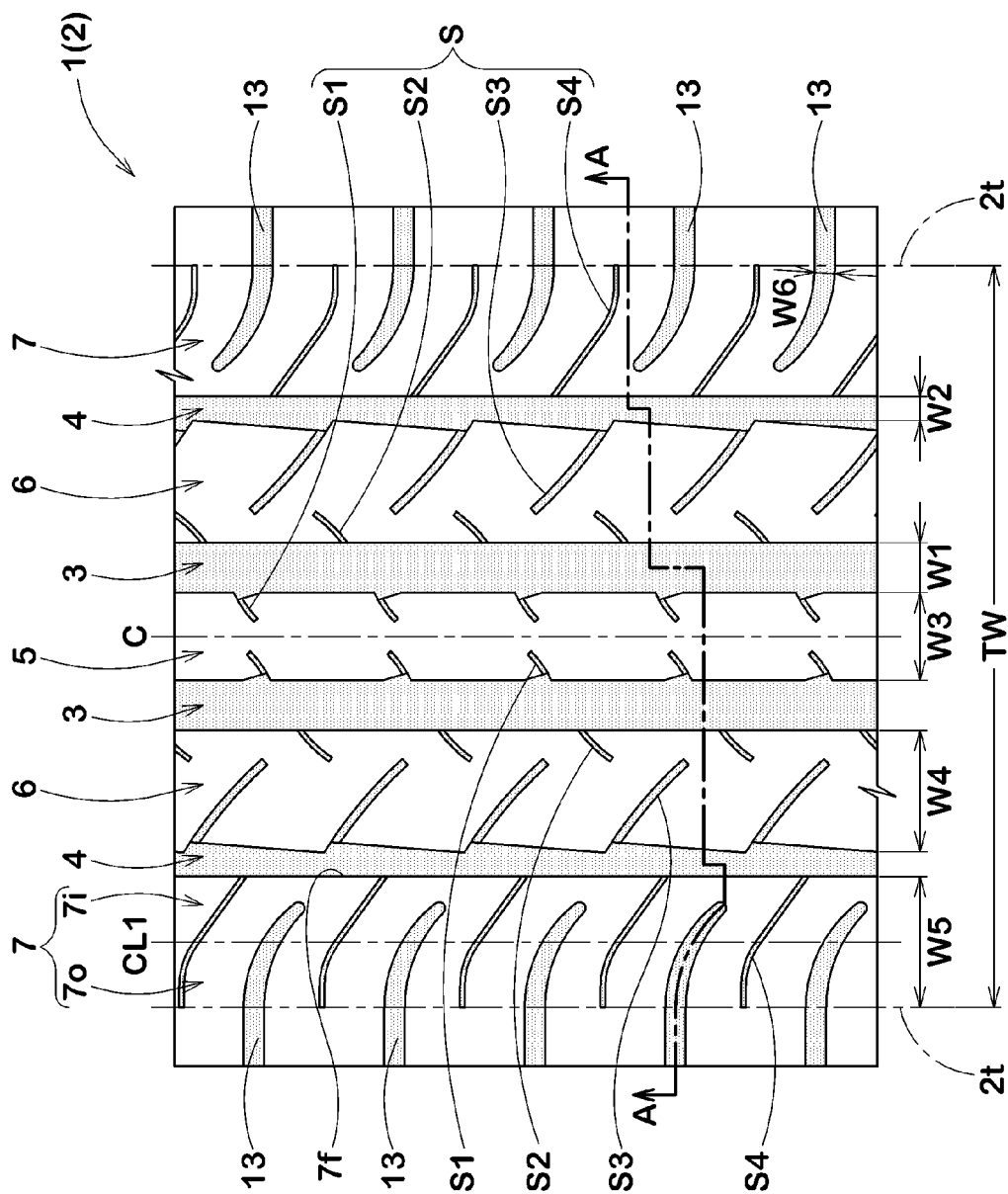
FIG. 1 is a development view of a tread portion of a pneumatic tire of the present embodiment.

1 Pneumatic tire
2 Tread portion
3 Crown circumferential groove
4 Shoulder circumferential groove
5 Crown rib
6 Middle rib
7 Shoulder rib
Rc Groove volume ratio of crown rib
Rm Groove volume ratio of middle rib
Rs Groove volume ratio of shoulder rib

BEST MODE FOR CARRYING OUT THE INVENTION

Hereinafter, an embodiment of the present invention will be described with referent to the drawings.

In the present embodiment, FIG. 1 shows a pneumatic tire 1 (hereinafter simply called a "tire") for passenger car.
A tread portion 2 of this tire 1 comprises
a pair of crown circumferential grooves 3 and 3 each extending continuously in the tire circumferential direction on either side of the tire equator C,
a pair of shoulder circumferential grooves 4 and 4 each extending continuously in the tire circumferential direction between the crown circumferential groove 3 and the tread ground-contacting end 2t.

Owing to the respective circumferential grooves 3 and 4, the tread portion 2 is provided with
a crown rib 5 extending between the crown circumferential grooves 3 and 3;
middle ribs 6 each extending between the crown circumferential groove 3 and the shoulder circumferential groove 4; and
shoulder ribs 7 each extending between the shoulder circumferential groove 4 and the ground-contacting end 2t.
The tire 1 comprising such a rib pattern has a higher rigidity of the tread portion 2 than a tire comprising a tread portion formed of a block row, and the cornering power in all load range can be improved, and the steering stability can be enhanced. Moreover, when also a large load on the tire 1, an excessive increase of the cornering power can be suppressed. When a large load on a front tire and the load of a rear tire is depressed in the tire 1, the cornering power of the rear tire can be relatively kept high and can improve the stability at high speeds. The tread portion 2 of the present embodiment comprises, for example, an unspecified-directional pattern having no specification of rotational direction.

The crown circumferential groove 3 and the shoulder circumferential groove 4 are made of straight grooves extending in the tire circumferential direction in a linear fashion. Such a circumferential groove has small drainage resistance, and it helps to improve the drainage performance. In the case of the passenger car tire of the present embodiment, the crown circumferential groove 3 and the shoulder circumferential groove 4 preferably have their minimum groove widths W1 and W2 of about from 5 to 10% of the tread grounding-contacting width TW, which is an axial distance between the tread ground-contacting ends 2t and 2t, and have their groove depths D1 and D2 (shown in FIG. 3) of about from 6 to 10 mm in order to make a good balance between the drainage performance and the tread rigidity. Particularly, the groove width W1 of the crown circumferential groove 3 is preferably not less than 8 mm, more preferably not less than 10 mm, and preferably not more than 18 mm, more preferably not more than 15 mm. The crown circumferential groove 3 is wider than a conventional one, and it has a longer ground contacting length and can improve the drainage performance near the tire equatorial plane CP having a high contact pressure. The groove width W1 of the crown circumferential groove 3 is preferably not less than 1.25 times, more preferably not less than 1.5 times, and preferably not more than 2.0 times, more preferably not more than 1.8 times the groove width W2 of the shoulder circumferential groove 4. When the groove width W1 is less than 1.25 times the groove width W2, the drainage performance of the crown rib 5 having a large groove rib ratio Rc may possibly decrease. When the groove width W1 is more than 2.0 times the groove width W2, the ground contacting area on the side of the tire equator C remarkably decreases, and the steering stability may possibly decrease.

The crown rib 5 is formed as a rib body extending continuously in the tire circumferential direction between the crown circumferential grooves 3 and 3. The expression "extending continuously" means that the rib body is not preferably divided by any axial grooves in the tire circumferential direction, and the above-mentioned axial groove includes no sipes. Such a crown rib 5 helps to increase the tire circumferential direction rigidity of the tread portion 2 and the straight running stability relative to the block row. The maximum axial width W3 of this crown rib 5 is preferably about from 10 to 20%, more preferably about from 13 to 17%.

Figure 2:
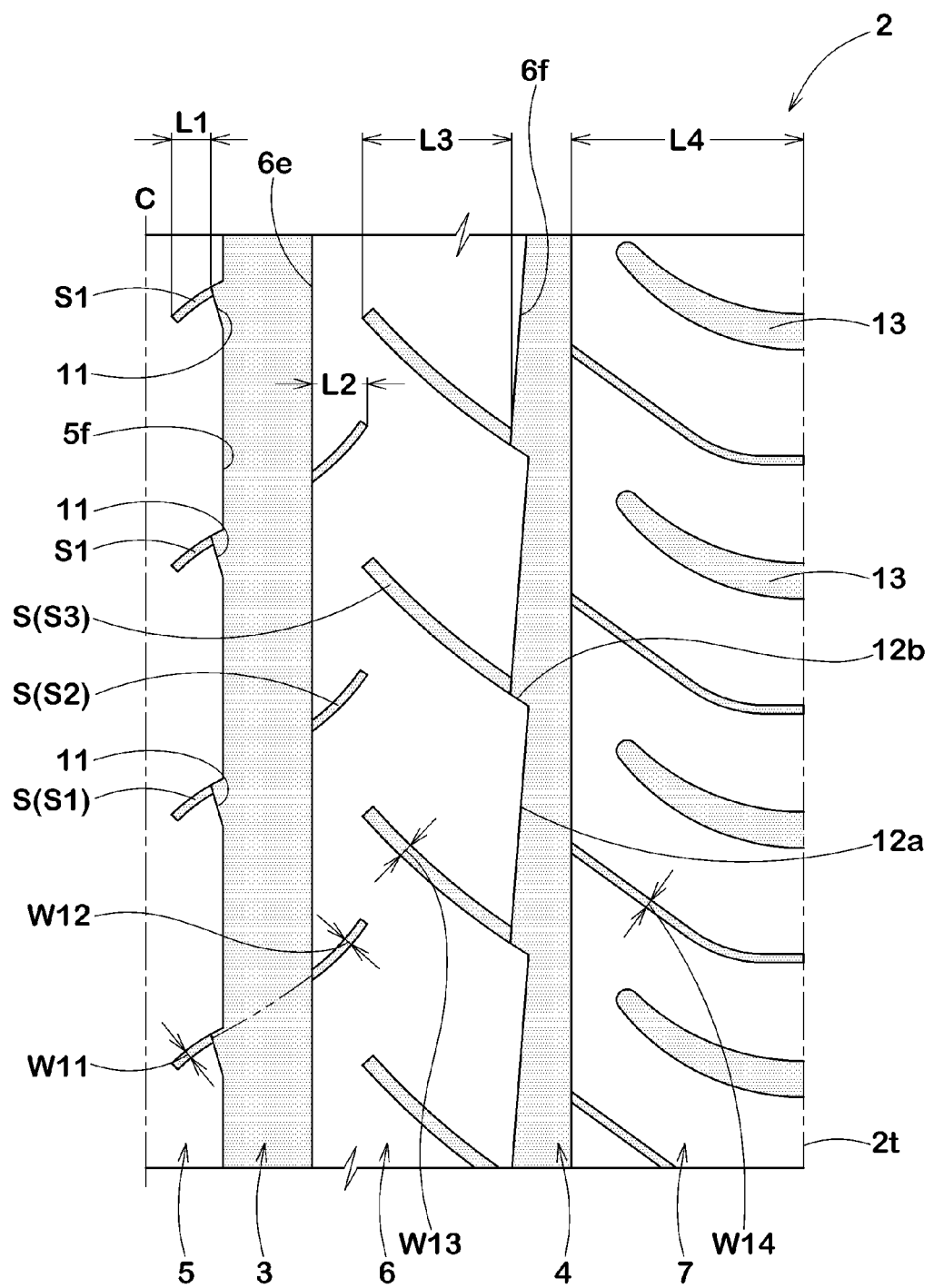
FIG. 2 is a right-side enlarged view of FIG. 1.

As shown in FIG. 2 in closeup, the rib edge 5f of the crown rib 5 comprises notched parts 11 having a small internal angle of two walls and spaced at an interval in the tire circumferential direction. The such a notched part 11 helps to induce a local disturbed flow of the air column passing through the crown circumferential groove 3, to suppress a columnar resonance being liable tending toward generate in the straight groove, and to reduce the driving noise.

As shown in FIG. 1, also the middle rib 6 is formed as a rib body extending continuously in the tire circumferential direction between the crown circumferential groove 3 and the shoulder circumferential groove 4. Such a middle rib 6 can suppress a lateral deformation amount while cornering and can generate a large lateral force compared with the block row. The maximum width W4 of this middle rib 6 is preferably, for example, about from 12 to 20%, more preferably about from 14 to 18% of the tread ground-contacting width TW.

As shown in FIG. 2 in closeup, the middle rib 6 comprises an axial inner rib edge 6e formed in a linear fashion in the tire circumferential direction, and an axial outer rib edge 6f formed in a zigzag fashion. Therefore, the rib edge 6f as same as the notched part 11 helps to induce a local disturbed flow of the air column passing through the shoulder circumferential groove 4, to suppress a columnar resonance in the shoulder circumferential groove 4, and reduce the driving noise. To suppress effectively the columnar resonance, the rib edge 6f is preferably formed of two zigzag pieces 12a and 12b having different lengths and arranged alternately in an unequal length zigzag fashion.

As shown in FIG. 1, also the shoulder rib 7 is formed as a rib body extending continuously in the tire circumferential direction between the shoulder circumferential groove 4 and the tread ground-contacting end 2t. Also such a shoulder rib 7 can suppress the lateral deformation while cornering and generate a larger lateral force compare with the block row. The maximum axial width W5 from this rib edge 7f of the shoulder rib 7 to the tread ground-contacting end 2t is preferably about from 14 to 22% of the tread ground-contacting width TW, more preferably about from 16 to 20%, for example.

The shoulder rib 7 is provided with a shoulder lug groove 13 which extends from the axially outer side than the tread ground-contacting end 2t to the inside in tire axial direction with a small inclination and terminates without reaching the shoulder circumferential groove 4. The inclination angle of this shoulder lug groove 13 with respect to the tire axial direction is set to be not more than 20 degrees. Such a shoulder lug groove 13 can introduce the water on the road surface toward the tread ground-contacting end 2t and can improve the drainage performance. The maximum groove width W6 (shown in FIG. 1) of the shoulder lug groove 13 disposed axially insider than the ground-contacting end 2t is preferably about from 0.4 to 1.0 times the groove width W2 of the shoulder circumferential groove 4; and the groove depth D3 (shown in FIG. 3) is preferably about from 5 to 9 mm.

Each of the rib 5, rib 6, and rib 7 of the present embodiment is provided with sipes S spaced at an interval in the tire circumferential direction. Such a sipe S helps each of the rib 5, rib 6, and rib 7 to keep the wear resistance and improve the drainage performance. Each sipe S is a slit having a narrow groove width, each groove width W11, width W12, width W13, and width W14 is set to about from 0.4 to 1.5 mm, for example. Each groove depth of the sipe S (not shown) is preferably set to about from 40 to 90%, more preferably about from 60 to 70% of the groove depth D1 of the crown circumferential groove 3, for example.

The crown rib 5 is provided with crown sipes S1 and S1 extending axially from each of crown circumferential grooves 3 and 3. The middle rib 6 is provided with an inner middle sipe S2 extending axially outward from the crown circumferential groove 3, and an outer middle sipe S3 extending axially inward from the shoulder circumferential groove 4. The shoulder rib 7 is provided with a shoulder sipe S4 extending axially outward from the shoulder circumferential groove 4.

The crown sipe S1 of the present embodiment extends axially inward at an angle from the crown circumferential groove 3 and terminates without reaching the tire equator C. Therefore, on the tire equator C in the crown rib 5, a region without sipe S is formed continuously in the circumferential direction. As shown in FIG. 1, the crown sipes S1 and S1 are shifted one another, but the positions may be matched together. An axial length L1 of this crown sipe S1 is preferably about from 15 to 45%, more preferably about from 25 to 35% of the maximum width W3 of the crown rib 5.

As shown in FIG. 2, the above-mentioned inner middle sipe S2 is inclined smoothly, extends axially outward from the crown circumferential groove 3, and terminates without reaching the shoulder circumferential groove 4. The inner middle sipe S2 is arranged so as to connect with the crown sipe S1 via the crown circumferential groove 3 on an inner side in the tire axial direction. The axial length L2 of the inner middle sipe S2 is preferably about from 15 to 40%, more preferably about from 20 to 30% of the maximum width W4 of the middle rib 6.

The outer middle sipe S3 of the present embodiment is inclined smoothly in the reverse direction to the inner middle sipe S2 with respect to the tire circumferential direction from the zigzag corner of the middle rib 6 and terminates without reaching the crown circumferential groove 3. The outer middle sipe S3 and the inner middle sipe S2 are spaced at an interval in the tire circumferential direction alternately. The axial length L3 of the outer middle sipe S3 is preferably about from 45 to 85%, more preferably, about from 55 to 75% of the maximum width W4 of the middle rib 6.

The shoulder sipe S4 is inclined at the substantially same angle of the shoulder lug groove 13, extends from the shoulder circumferential groove 4t and terminates near the ground-contacting edge 2t. The shoulder sipe S4 and the shoulder lug groove 13 are spaced at an interval alternately. An axial length L4 of the shoulder sipe S4 of the present embodiment is set to be larger than the axial length L3 of the outer middle sipe S3, and is preferably about from 80 to 110%, more preferably about from 90 to 100% of the maximum width W5 of the shoulder rib 7.

Thus, in the tire 1 of the present embodiment, a groove volume ratio Rc of the crown rib 5, a groove volume ratio Rm of the middle rib 6, and a groove volume ratio Rs of the shoulder rib 7 satisfy the following relationship:

$$Rc <= Rm < Rs.$$

The groove volume ratio Rc, groove volume ratio Rm, and groove volume ratio Rs are, respectively, ratios of the total volume of the grooves and sipes disposed in each of the rib 5, rib 6, and rib 7 to respective volumes of the crown rib 5, middle rib 6, and shoulder rib 7, where the sipes S and the shoulder lug groove 13 are filled up completely.

Figure 3:
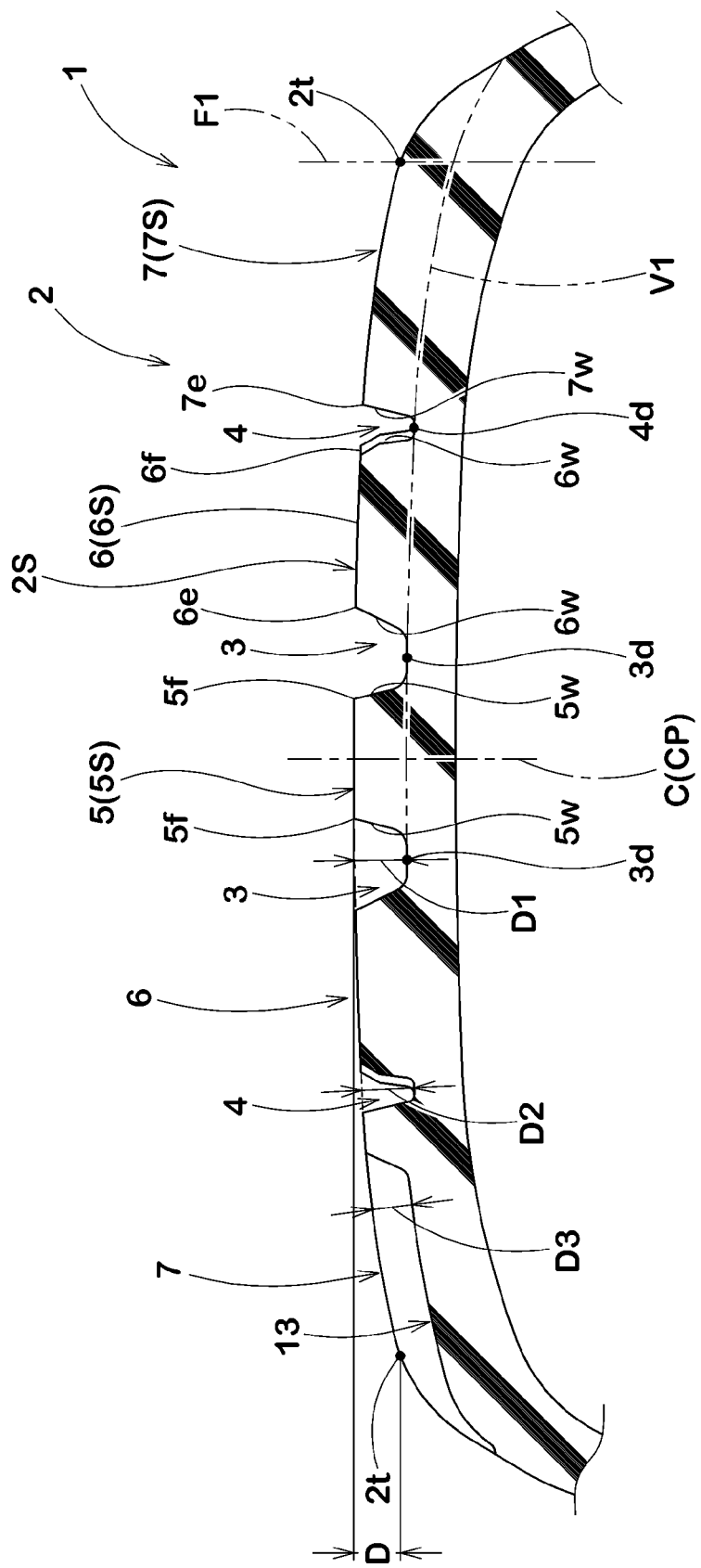
FIG. 3 is a cross-sectional view taken on line A-A of FIG. 1.

As shown in FIG. 3, the volume of the crown rib 5 is defined as a volume surrounded by:
a virtual line V1 extending along the outer surface 2S of the tread portion 2 passing through the deepest point 3d of the crown circumferential groove 3 and the deepest point 4d of the shoulder circumferential groove 4;
a tread 5S of the crown rib 5; and
outside walls 5w and 5w extending from the rib edge 5f of the crown rib 5 to the deepest point 3d of the crown circumferential groove 3.

The volume of the middle rib 6 is defined as a volume surrounded by:
the virtual line V1;
a tread 6S of the middle rib 6; and
an inside wall 6we extending from the axial inner rib edge 6e of the middle rib 6 to the deepest point 3d of the crown circumferential groove 3; and
an outside wall 6wf extending from the axial outer rib edge 6f to the deepest point 4d of the shoulder circumferential groove 4. The volume of the shoulder rib 7 is defined as a volume surrounded by:
the virtual line V1;
a tread 7S of the shoulder rib 7;
an inside wall 7w extending from a rib edge 7e of the shoulder rib 7 to deepest point 4d of the shoulder circumferential groove 4; and
a surface F1 passing through the ground-contacting end 2t and being parallel to the tire equator surface CP.

In this way, in the tire meeting the above-mentioned relation among the groove volume ratios Rc, Rm, and Rs, the crown rib 5 on which the largest ground pressure acts is set to have a higher circumferential rigidity than the shoulder rib 7. Therefore, the crown rib 5 increases effectively the cornering power in all load range so as to improve the steering stability.

Since the crown rib 5 having the relatively increased circumferential rigidity, the cornering power can be effectively improved at a low loaded state of that the ground contacting area rate increases inside the ground-contacting surface.

To improve effectively the above-mentioned function, the groove volume ratio Rc of the crown rib 5 and the groove volume ratio Rm of the middle rib 6 are preferably not less than 5%, more preferably not less than 10%, and preferably not more than 30%, more preferably not more than 15%. When the groove volume ratios Rc and Rm are less than 5%, the drainage performance may excessively deteriorate. When the groove volume ratios Rc and Rm are over 30%, the ground contacting area reduces, and the wear life may deteriorate.

Moreover, the groove volume ratio Rc of the crown rib 5 is preferably smaller than the groove volume ratio Rm of the middle rib 6. In this way, since the lateral rigidity of the each rib reduces gradually from the crown rib 5 toward the shoulder rib 7, the transitional characteristic while cornering and the stability while changing lanes improve, and the steering stability can be improved.

The groove volume ratio Rs of the shoulder rib 7 is preferably not less than 7%, more preferably not less than 12%, and preferably not more than 35%, more preferably not more than 20%. When the above-mentioned groove volume ratio Rs is less than 7%, the drainage performance, especially the hydroplaning phenomenon performance, may deteriorate. When the groove volume ratio Rs is over 35%, the rigidity of the shoulder rib 7 excessively decreases, and off-balance wear may possibly arise.

As shown in FIG. 1, the above-mentioned shoulder rib 7 is divided virtually into an inward region 7i disposed on the axially inward side and an outward region 7o disposed on the axially outward side with respect to a shoulder rib center line CL1 passing through its center of the maximum axial width W5 and extending in the tire circumferential direction. In this case, it is preferable that the groove volume ratio Rsi of the inward region 7i is smaller than the groove volume ratio Rso of the outward region 7o. Therefore, the shoulder rib 7 can make the rigidity change smooth from the shoulder circumferential groove 4 toward the ground-contacting end 2t, and can improve the steering stability. Moreover, in the shoulder rib 7, the circumferential rigidity of the inward region 7i is higher than that of the outward region 7o. Therefore, at the low load when the ratio of the ground contacting area of the inward region 7i is relatively higher, the cornering power can be improved more.

The groove volume ratio Rso of the outward region 7o is preferably not less than 1.1 times, more preferably not less than 1.3 times the groove volume ratio Rsi of the inward region 7i. And, the groove volume ratio Rso of the outward region 7o is preferably not more than 1.5 times, more preferably not more than 1.1 times the groove volume ratio Rsi of the inward region 7i. When the groove volume ratio Rso is less than 1.1 times the above-mentioned groove volume ratio Rsi, it may impossibly smooth well the rigidity change. When the groove volume ratio Rso is over 1.5 times the groove volume ratio Rsi, the rigidity changes rapidly, and the off-balance wear may possibly arise in the shoulder rib 7.

The groove width W13 of the outer middle sipe S3 is preferably larger than the groove width W12 of the inner middle sipe S2. The outer middle sipe S3 can introduce the water on the road surface from the ground-contacting center of the middle rib 6 to the axial outer rib edge 6f and can improve the drainage performance. Moreover, in the middle rib 6, the circumferential rigidity on the tire axially inside is set to higher than the outside; therefore, the cornering power can be improved at the low load when the inside ground-contacting area ratio and the ground pressure relatively increase. From the viewpoint of this, the groove width W13 of the outer middle sipe S3 is preferably not less than 105%, more preferably not less than 110% of the groove width W12 of the inner middle sipe S2. When the groove width W13 of the outer middle sipe S3 is too large, the rigidity with respect to the shoulder rib 7 decreases, and the cornering power in a low load may possibly deteriorate. From the viewpoint of this, the groove width W13 of the outer middle sipe S3 is preferably not more than 200%, more preferably not more than 160% of the groove width W12 of the inner middle sipe S2.

From the same viewpoint, the groove depth (not shown) of the outer middle sipe S3 is preferably not less than 105%, more preferably not less than 110%; preferably not more than 200%, more preferably not more than 160% of the groove depth (not shown) of the inner middle sipe S2.

As shown in FIG. 3, at the above-mentioned standard state, a ratio (D/TW) can be set arbitrarily. The ratio (D/TW) is a ratio between the tread ground-contacting width TW (shown in FIG. 1) and a camber amount D, which is a radial distance from the tread ground-contacting end 2t to the tire equator C. When the ratio (D/TW) is too small, the ground pressure on the shoulder rib 7 excessively increases, and the effects of the present invention may possibly act insufficiently. Therefore, the ratio (D/TW) is preferably not less than 0.03, more preferably not less than 0.04. When the ratio (D/TW) is too large, the ground pressure on the shoulder rib 7 excessively increases, and the steering stability may possibly decrease. Therefore, the ratio (D/TW) is preferably not more than 0.06, more preferably not more than 0.05.

Figure 4:
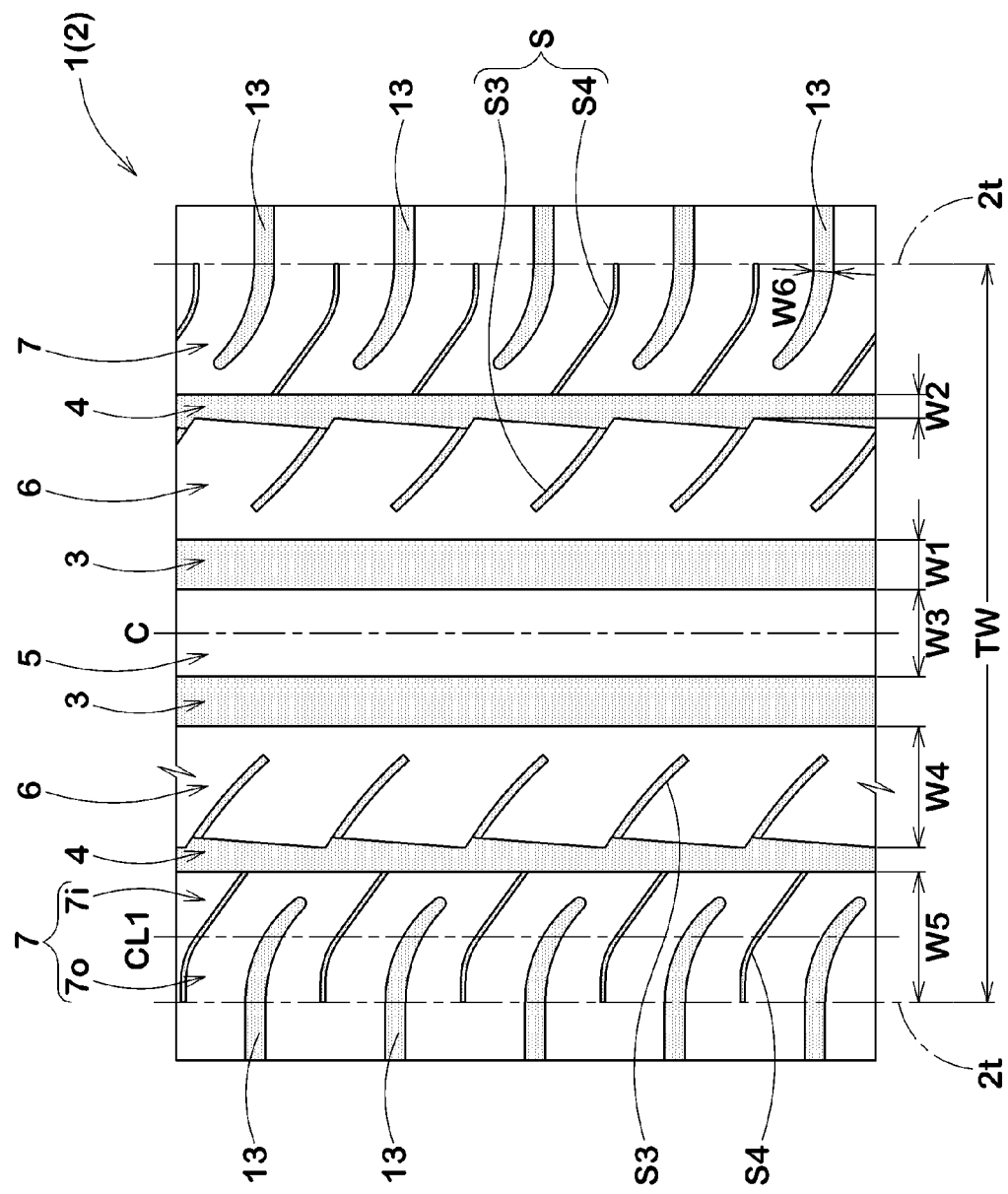
FIG. 4 is a development view of the tread portion of the pneumatic tire of another embodiment.

FIG. 4 shows yet another embodiment of the tire 1 of the present embodiment. In the tire 1 of this embodiment, the crown rib 5 is formed of a plane rib body without neither groove nor crown sipe S1 (shown in FIG. 1). Moreover, the middle rib 6 is provided with only the outer middle sipe S3. In such a tire 1, the groove volume ratio Rc of the crown rib 5 and the groove volume ratio Rm of the middle rib 6 can be set much smaller, in the entire load range, particularly in a low load, the cornering power can enhance more, and the steering stability can be improved significantly.

Figure 5:
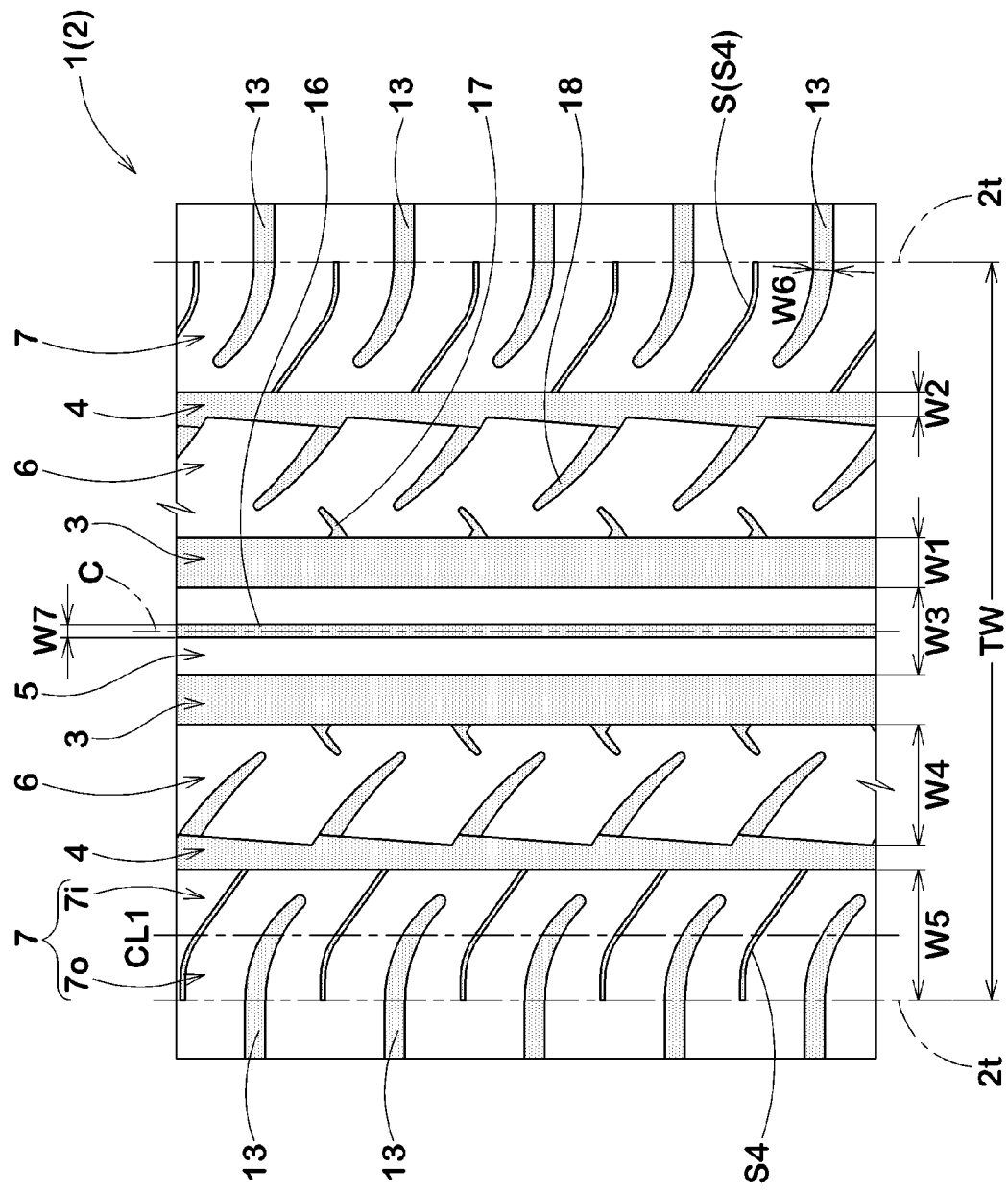
FIG. 5 is a development view of the tread portion of the pneumatic tire of yet another embodiment.

As shown in FIG. 5, the crown rib 5 can be provided with a narrow groove 16 of the circumferential direction extending on the substantially tire equator C. The middle rib 6 can be provided with inner and outer middle rug grooves 17 and 18 instead of the inner and outer middle sipes S2 and S3 (shown in FIG. 2). This tire 1 can improve the drainage performance while keeping the steering stability. In the narrow groove 16, the groove width W7 is preferably about from 5 to 20% of the maximum width W3 of the crown rib 5, and a groove depth (not shown) is preferably about from 7 to 15% of the groove depth D1 (shown in FIG. 3) of crown circumferential groove 3.

Hereinbefore, especially preferred embodiments of the present invention were described, but it will be obvious that various changes may be made without limitation to what was shown in the drawings.

EXAMPLE

A pneumatic tire comprising a tread portion shown in Table 1 was made, and its property was estimated. For comparison, a tire (Reference Example 1) was also tested. The tire in Reference Example 1 had a groove volume ratio Rs of a shoulder rib, shown in FIG. 6, being larger than a groove volume ratio Rc of a crown rib and a groove volume ratio Rm of a middle rib.
The common specifications were as follows:
  Tire size: 215/55R17
  Rim size: 7.0 J×17
  Tread ground-contacting width TW: 155 mm
  Groove depth D1 of crown circumferential groove: 8.0 mm
  Groove depth D2 of shoulder circumferential groove: 8.0 mm
  Maximum width W3 of crown rib: 20 mm
  Maximum width W4 of middle rib: 25 mm
  Maximum width W5 of shoulder rib: 28 mm
  Shoulder lug groove:
  Groove width W6: from 2.5 to 4.0 mm
  Groove depth D3: 7.0 mm
  Crown sipe:
  Axial length L1: 3.5 mm
  Groove width W11: 0.6 mm
  Groove depth: 6.5 mm
  Inner middle sipe:
  Axial length L2: 6 mm
  Groove width W12: 0.6 mm
  Groove depth: 6.5 mm
  Outer middle sipe:
  Axial length L3: 18 mm
  Groove width W13: 1.0 mm
  Groove depth: 6.5 mm
  Shoulder sipe:
  Axial length L4: 23 mm
  Groove width W14: 0.6 mm
  Groove depth: 6.5 mm
  Test method was as follows.

<Cornering Power>

The each test tire was mounted on the rim and inflated so as to have an internal pressure of 230 kPa by use of an indoor tester, and cornering power at a time of a load of 3.4 kN and of 2.2 kN, respectively. The test result is indicated in using indices with the cornering power at the time of the load of 3.4 kN shown in the Example 1 being 100; the larger the numeric value is, the larger the cornering power is.
Slip angle: 1 deg.

<Steering Stability>

The each test tire was mounted on the rim and inflated so as to have internal pressures (front wheel: 220 kPa; rear wheel: 220 kPa), and applied on a domestically produced FF car of 2400 cc displacement (front wheel load: 4.7 kN; rear wheel load: 3.3 kN). A professional test driver drove the test car on a test course of an asphalt road surface, and properties such as handle responsibility, rigidity, grip and the like were tested in the driver's feeling. The test result is indicated using indices with the Example 1 being 100; and the larger the numeric value is, the more favorable it is.

<Ride Comfort>

By use of the car having the same condition as the above, the test car ran on dry asphalt road surfaces such as bumpy road, Belgian road (stone-paved road) or Bitsman road (graveled road surface), the rough feeling, knocking up, and dumping were tested with the driver's feeling. The test result is indicated using indices with the Example 1 being 100; and the larger the numeric value is, the more favorable it is.

<Drainage Performance>

By use of the car having the same condition as the above, the test car went into a test course provided with a water puddle of 5 mm in depth and 20 m in length on an asphalt road surface of 100 m in radius, and ran in gradually increasing its speed, so as to measure an average lateral acceleration of the front wheel and rear wheel at the speed of from 50 to 80 km/h. The test result is indicated using indices with the average lateral acceleration of Example 1 being 100; and the larger the numeric value is, the more favorable it is.

<Pass-By Noise Property>

In accordance with an actual vehicle-coasting test prescribed in JASO/C/606, the test car coasted 50 m through a straight-line test course (asphalt road surface) at the speed of 60 km/h. There was a fixed microphone at the midpoint of the course located 7.5 m from the running center line and 1.2 m from the road surface, and measured the maximum pass-by noise level dB(A). The test result is indicated using indices with the reciprocal of the pass-by noise of Example 1 being 100. The larger the numeric value is, the more favorable the pass-by noise is.

<Noise Property>

By use of the car having the same condition as the above, the test car ran on the smooth road surface at the speed of 60 km/h, and magnitude of pattern noise was evaluated with the driver's feeling. The test result is indicated using indices with the Example 1 being 100; and the larger the numeric value is, the more favorable it is. The result is shown in Table 1.

TABLE 1

Figure 6:
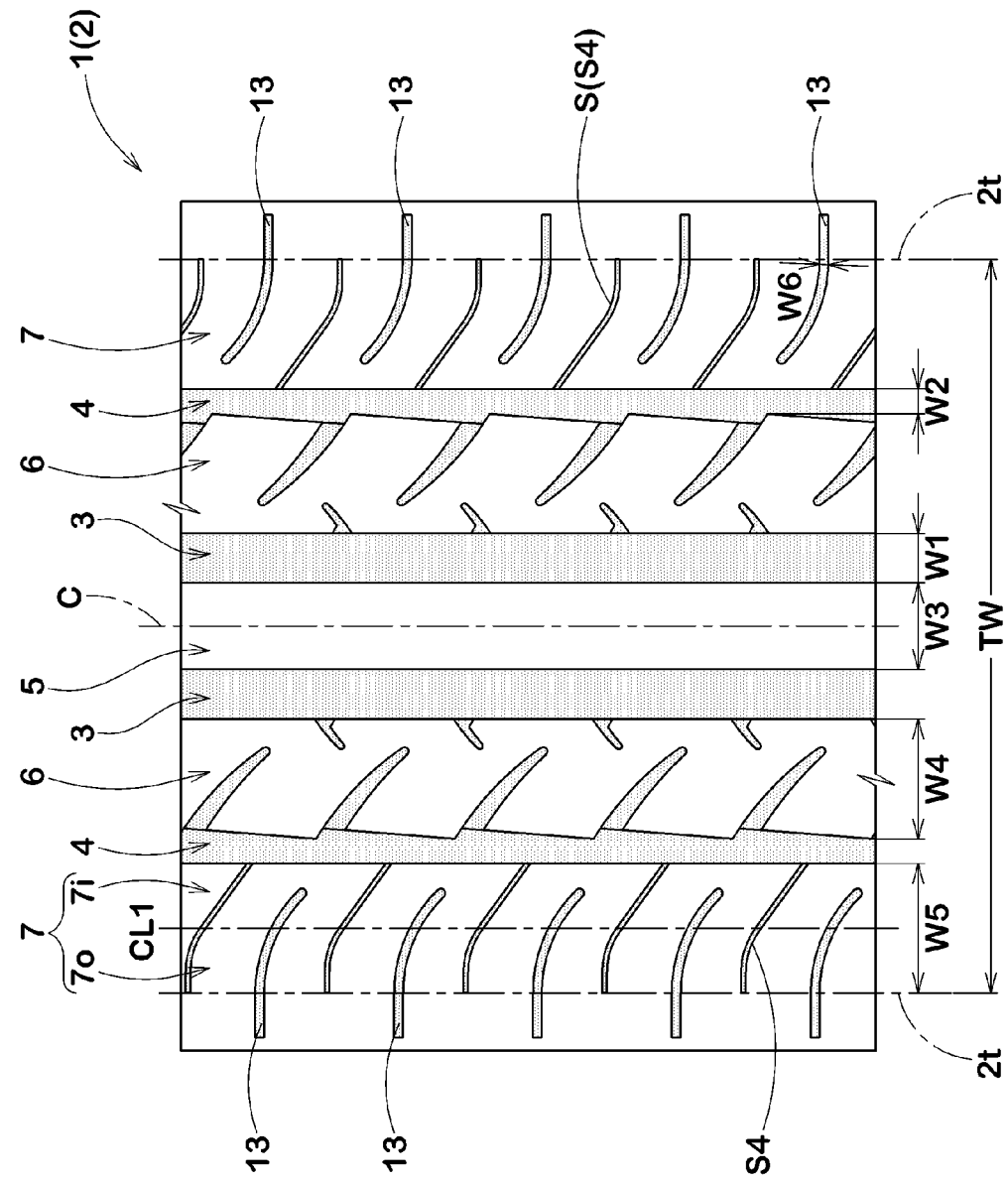
FIG. 6 is a development view of the tread portion of the pneumatic tire of Reference Example 1.

|  | Comparative Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Developed drawing of tread portion | Fig. 6 | Fig. 5 | Fig. 2 | Fig. 4 | Fig. 2 | Fig. 2 | Fig. 2 | Fig. 2 | Fig. 2 | Fig. 2 | Fig. 2 | Fig. 2 |
| Groove volume ratio Rc (%) of crown rib | 30 | 30 | 20 | 10 | 25 | 20 | 20 | 20 | 20 | 20 | 20 | 20 |
| Groove volume ratio Rm (%) of middle rib | 30 | 30 | 20 | 10 | 25 | 25 | 20 | 20 | 20 | 20 | 20 | 20 |
| Groove volume ratio Rs (%) of shoulder rib | 15 | 35 | 25 | 25 | 15 | 30 | 25 | 25 | 25 | 25 | 25 | 25 |
| Groove volume ratio Rsi (%) of inward region | 11 | 11 | 11 | 11 | 11 | 11 | 11.8 | 9.3 | 11 | 11 | 11 | 11 |
| Groove volume ratio Rso (%) of outward region | 13 | 13 | 13 | 13 | 13 | 13 | 13 | 13 | 13 | 13 | 13 | 13 |
| Ratio (Rso/Rsi) | 1.2 | 1.2 | 1.2 | 1.2 | 1.2 | 1.2 | 1.1 | 1.4 | 1.2 | 1.2 | 1.2 | 1.2 |
| Minimum groove width W1 (mm) of crown circumferential groove | 8.8 | 8.8 | 8.8 | 8.8 | 8.8 | 8.8 | 8.8 | 8.8 | 7.8 | 9.4 | 8.8 | 8.8 |
| Minimum groove width W2 (mm) of shoulder circumferential groove | 5.2 | 5.2 | 5.2 | 5.2 | 5.2 | 5.2 | 5.2 | 5.2 | 6.2 | 4.7 | 5.2 | 5.2 |
| Ratio (W1/W2) | 1.7 | 1.7 | 1.7 | 1.7 | 1.7 | 1.7 | 1.7 | 1.7 | 1.25 | 2.00 | 1.7 | 1.7 |
| Camber amount D (mm) | 6.5 | 6.5 | 6.5 | 6.5 | 6.5 | 6.5 | 6.5 | 6.5 | 6.5 | 6.5 | 4.5 | 9.3 |
| Ratio (D/TW) | 0.04 | 0.04 | 0.04 | 0.04 | 0.04 | 0.04 | 0.04 | 0.04 | 0.04 | 0.04 | 0.03 | 0.06 |
| Cornering power (3.4 kN) (index) [Larger is better.] | 103 | 100 | 105 | 108 | 103 | 105 | 103 | 108 | 105 | 105 | 108 | 95 |
| Cornering power (2.2 kN) (index) [Larger is better.] | 75 | 75 | 81 | 85 | 82 | 79 | 79 | 81 | 81 | 79 | 85 | 70 |
| Steering stability (index) [Larger is better.] | 90 | 100 | 110 | 120 | 105 | 115 | 105 | 105 | 110 | 105 | 105 | 95 |
| Ride comfort (index) [Larger is better.] | 100 | 100 | 110 | 90 | 105 | 110 | 105 | 105 | 110 | 110 | 100 | 120 |
| Drainage performance (index) [Larger is better.] | 90 | 100 | 100 | 100 | 100 | 100 | 100 | 95 | 95 | 105 | 95 | 120 |
| Pass-by noise property (index) [Larger is better.] | 110 | 100 | 100 | 100 | 100 | 100 | 100 | 100 | 100 | 100 | 100 | 110 |
| Noise property (index) [Larger is better.] | 120 | 100 | 110 | 115 | 105 | 110 | 110 | 110 | 110 | 110 | 110 | 120 |

For the test result, it was confirmed that, according to the invention, the tire of Example enabled improving the steering stability by increasing the cornering power in all load range. It was also confirmed that the tire of Example enabled improving the drainage performance while maintaining the ride comfort, the pass-by noise property, and the noise property.

The invention claimed is:

1. A pneumatic tire comprising a tread portion provided with:
    a pair of crown circumferential grooves extending continuously in a tire circumferential direction on either side of a tire equator;
    a pair of shoulder circumferential grooves extending continuously in the tire circumferential direction between said crown circumferential groove and a tread ground-contacting end on each side of the tire equator;
    a crown rib extending continuously in the tire circumferential direction between said crown circumferential grooves;
    a pair of middle ribs each extending continuously in the tire circumferential direction between said crown circumferential groove and said shoulder circumferential groove on each side of the tire equator, each of the middle ribs being provided with (i) an inner middle sipe extending outward in the tire axial direction from said crown circumferential groove and terminating without reaching said shoulder circumferential groove and (ii) an outer middle sipe extending inward in the tire axial direction from said shoulder circumferential groove and terminating without reaching said crown circumferential groove, wherein (a) the outer middle sipe has a width larger than that of the inner middle sipe, (b) the outer middle sipe and inner middle sipe are inclined with respect to an axial direction of the tire, and (c) the outer middle sipe is inclined in an opposite direction of the inner middle sipe; and
    a pair of shoulder ribs each extending continuously in the tire circumferential direction between said shoulder circumferential groove and said tread ground-contacting end on each side of the tire equator,
    wherein a groove volume ratio Rc of the crown rib, which is a ratio of the total volume of the grooves and sipes provided on the crown rib to said the rib volume of the crown rib, a groove volume ratio Rm of the middle rib, and a groove volume ratio Rs of the shoulder rib satisfy the relationship Rc≤Rm<Rs.

2. The pneumatic tire as set forth in claim 1, wherein the minimum groove width of said crown circumferential groove is from 8 to 18 mm and is from 1.25 to 2.0 times the minimum groove width of said shoulder circumferential groove.

3. The pneumatic tire as set forth in claim 1 or 2, wherein said crown rib is provided with a plurality of crown Sipes extending inward in the tire axial direction from a pair of said crown circumferential grooves and terminating without reaching the tire equator.

4. The pneumatic tire as set forth in claim 3, wherein the axial length of said inner middle sipe is in a range of from 100 to 130% of the axial length of said crown sipe.

5. The pneumatic tire as set forth in claim 1, wherein said shoulder rib comprises
   a shoulder lug groove extending inward in the tire axial direction from said tread ground-contacting end and terminating without reaching said shoulder circumferential groove, and
   a shoulder sipe extending outwardly from said shoulder circumferential groove in the tire axial direction.

6. The pneumatic tire as set forth in claim 5, wherein an axial length of said shoulder sipe is larger than an axial length of said outer middle sipe.

7. The pneumatic tire as set forth in claim 1, wherein said shoulder rib comprises
   an inward region disposed axially inward with respect to a shoulder rib center line passing through its center of the maximum axial width and extending in the tire circumferential direction, and
   an outward region disposed axially outward with respect to said shoulder rib centerline,
   wherein the groove volume ratio Rso of said outward region is from 1.1 times to 1.5 times the groove volume ratio Rsi of said inward region.

8. The pneumatic tire as set forth in claim 1, wherein
   at a standard state where the tire is mounted on a standard rim, inflated at a standard internal pressure, and no-loaded, a ratio (D/TW) between a camber amount D and a tread ground-contacting width TW is from 0.04 to 0.05; and
   the tread ground-contacting width TW is an axial distance between said tread ground-contacting ends, and the camber amount D is a radial distance from the tread ground-contacting end to the tire equator.

9. The pneumatic tire as set forth in claim 1, wherein
   the groove volume ratio Re of said crown rib and the groove volume ratio Rm of said middle rib are from 5 to 30%, and
   the groove volume ratio Rs of said shoulder rib is from 7 to 35%.

10. The pneumatic tire as set forth in claim 1, wherein the middle rib comprises
    an axially inner rib edge foamed in a linear fashion in the tire circumferential direction and
    an axially outer rib edge formed in a zigzag fashion, wherein the axially outer rib edge comprises two zigzag elements having different lengths which are arranged alternately in the tire circumferential direction.

11. The pneumatic tire as set forth in claim 10, wherein the outer middle sipe extends from a zigzag corner formed on the axially outer rib edge of the middle rib.

12. A pneumatic tire comprising a tread portion provided with:
    a pair of crown circumferential grooves extending continuously in a tire circumferential direction on either side of a tire equator;
    a pair of shoulder circumferential grooves extending continuously in the tire circumferential direction between said crown circumferential groove and a tread ground-contacting end on each side of the tire equator;
    a crown rib extending continuously in the tire circumferential direction between said crown circumferential grooves;
    a pair of middle ribs each extending continuously in the tire circumferential direction between said crown circumferential groove and said shoulder circumferential groove on each side of the tire equator, each of the middle ribs being provided with (i) an inner middle sipe extending outward in the tire axial direction from said crown circumferential groove and terminating without reaching said shoulder circumferential groove and (ii) an outer middle sipe extending inward in the tire axial direction from said shoulder circumferential groove and terminating without reaching said crown circumferential groove, wherein the outer middle sipe and inner middle sipe are inclined with respect to an axial direction of the tire and the outer middle sipe is inclined in an opposite direction of the inner middle sipe, wherein the middle rib comprises an axially inner rib edge formed in a linear fashion in the tire circumferential direction and an axially outer rib edge formed in a zigzag fashion, wherein the axially outer rib edge comprises two zigzag elements having different lengths which are arranged alternately in the tire circumferential direction; and
    a pair of shoulder ribs each extending continuously in the tire circumferential direction between said shoulder circumferential groove and said tread ground-contacting end on each side of the tire equator,
    wherein a groove volume ratio Rc of the crown rib, which is a ratio of the total volume of the grooves and sipes provided on the crown rib to said the rib volume of the crown rib, a groove volume ratio Rm of the middle rib, and a groove volume ratio Rs of the shoulder rib satisfy the relationship Rc≤Rm<Rs.

\* \* \* \* \*